(No Model.)
A. T. STRAUCH.
PIANO DAMPER.
No. 515,176. Patented Feb. 20, 1894.
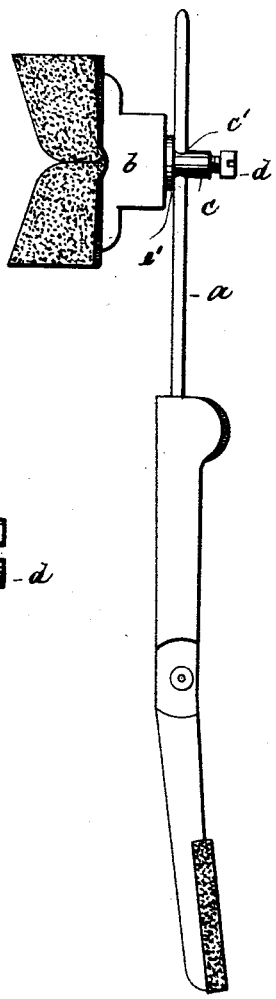
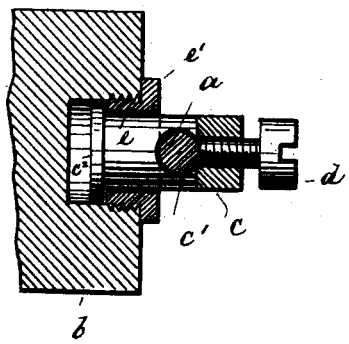
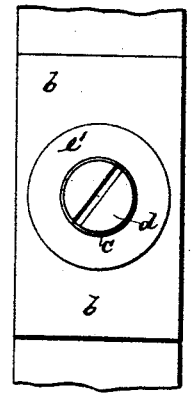
WITNESSES:
A. Schehl.
Wm. Schulz.
INVENTOR
A. T. Strauch
BY Roeder & Briesen
ATTORNEYS.

UNITED STATES PATENT OFFICE.

ALBERT T. STRAUCH, OF NEW YORK, N. Y.

PIANO-DAMPER.

SPECIFICATION forming part of Letters Patent No. 515,176, dated February 20, 1894.

Application filed April 27, 1893. Serial No. 472,010. (No model.)

*To all whom it may concern:*

Be it known that I, ALBERT T. STRAUCH, of New York city, New York, have invented an Improved Piano-Damper, of which the following is a specification.

This invention relates to an improved damper for upright piano actions and more particularly to the means for attaching the damper wire to the damper head or block so that the damper may be readily set at any desired angle to the wire.

In the accompanying drawings Figure 1 is an elevation of my improved piano damper. Fig. 2 is a transverse horizontal section partly in elevation through the pin $c$, and Fig. 3 an end view of the damper.

The letter $a$, represents the damper wire and $b$, is the damper head or the damper block in case the latter is used. The wire $a$, passes through a perforation $c'$, of a metal pin $c$, provided with the set screw $d$, that engages and bears upon the wire. The lower end of the pin $c$, is surrounded by a metal bushing or ring $e$, having a threaded body that engages a tapped mortise of the damper head. The bushing is provided with an outwardly projecting flange $e'$, surrounding the mortise as shown. Below the bushing $e$ the pin $c$, is headed or upset as at $c^2$, so as to prevent withdrawal of the pin from the bushing, though permitting a free revolution of the latter.

When the screw $d$, is tightened up, the damper wire $a$, will be pressed down upon the flange $e'$, of bushing $e$, and will in this manner hold the bushing and with it the damper tightly in place. When, however, the screw is slackened, the wire $a$, will no longer bear upon the bushing and in this way the bushing and with it the damper will be liberated and may be freely set to the desired inclination.

What I claim is—

1. The combination of a perforated pin that is adapted to receive the damper wire with a surrounding bushing secured to the damper head and revoluble around the pin, substantially as specified.

2. The combination of a perforated pin with a set screw, a damper wire engaged by the set screw and with a bushing revoluble around the pin and adapted to be locked by the damper wire, substantially as specified.

3. The combination of a perforated pin having a head $c^2$, with a set screw that engages the damper wire and with a flanged and threaded bushing that surrounds the pin, substantially as specified.

ALBERT T. STRAUCH.

Witnesses:
F. V. BRIESEN,
WM. SCHULZ.